United States Patent
Phipps (10) Patent No.: US 7,000,554 B2
(45) Date of Patent: Feb. 21, 2006

(54) FRICTIONALLY REDUCED HULL

(76) Inventor: Gary G. B. Phipps, P.O. Box 91339, West Vancouver, British Columbia (CA) V7V 3N9

( * ) Notice: Subject to any disclaimer, the term of this patent is extended or adjusted under 35 U.S.C. 154(b) by 0 days.

(21) Appl. No.: 10/768,063

(22) Filed: Feb. 2, 2004

(65) Prior Publication Data

US 2005/0166816 A1    Aug. 4, 2005

(51) Int. Cl.
*B63B 1/34* (2006.01)
(52) U.S. Cl. .................................. 114/67 A
(58) Field of Classification Search ............. 114/67 A, 114/67 R
See application file for complete search history.

(56) References Cited

U.S. PATENT DOCUMENTS

| | | | |
|---|---|---|---|
| 1,398,246 A | 11/1921 | Trask | |
| 1,656,411 A | 1/1928 | Baldwin | |
| 2,378,822 A | 6/1945 | Barry | |
| 2,608,171 A | 8/1952 | Pearce | |
| 2,754,791 A | 7/1956 | Nieding | |
| 3,534,699 A | 10/1970 | Ruona | |
| 3,827,388 A * | 8/1974 | Fulton | 440/44 |
| 4,543,900 A * | 10/1985 | Aker | 114/40 |
| 5,031,559 A | 7/1991 | Bartholomew | |
| 5,456,201 A * | 10/1995 | Bobst | 114/289 |
| 5,803,410 A | 9/1998 | Hwang | |
| 2001/0022152 A1 | 9/2001 | Takahashi | |
| 2002/0014192 A1* | 2/2002 | Takahashi et al. | 114/67 A |

FOREIGN PATENT DOCUMENTS

| | | |
|---|---|---|
| JP | 2002068073 | 3/2005 |
| JP | 2001106171 | 4/2005 |

\* cited by examiner

*Primary Examiner*—Ed Swinehart
(74) *Attorney, Agent, or Firm*—Norman M. Cameron

(57) ABSTRACT

A frictionally reduced hull is provided for a marine vessel, the hull having a water line, a bow end and an aft end. The hull has a first opening below the water line and a second opening below the water line. The first opening is closer than the second opening to the bow end. A first conduit extends from the first opening to the second opening, whereby water flows into the conduit through the first opening and passes through the conduit from the first opening towards the second opening, exiting at the second opening. A second conduit extends into the first conduit between the first opening and the second opening, fluid being drawn into the first conduit via the second conduit and exiting at the second opening.

8 Claims, 8 Drawing Sheets

FRICTIONALLY REDUCED HULL

BACKGROUND OF THE INVENTION

This invention relates to frictionally reduced hulls for marine craft as well as to hulls with decreased wave making resistance.

It has long been recognized that the performance of marine craft can be significantly improved by reducing the friction between the hull of the craft and the water. The prior art shows various ways of trying to introduce air at the interface between the hull and the body of water. For example, U.S. Patent Application Publication No. US 2001/0022152 discloses the reduction of frictional resistance by drawing air through a conduit into a negative pressure region on the hull. However the system has certain disadvantages. It requires that the conduit project below the hull of the marine craft, thereby increasing friction. Also the air conduit must extend vertically upwards for a significant distance to a position above the water line. A mechanism must be provided to raise and lower the conduit. For example, the conduit may have to be 30 ft. long for a tanker and requires seals to prevent flooding.

The engine power or wind power required to drive a vessel through water is used approximately equally to overcome wave making resistance (50% being at the bow of the vessel) and viscous drag (50% being at the submerged hull/water interface). By comparison, superstructure resistance is minimal.

One recent method for reducing wave making resistance has been attaching a bulbous bow which increases the length of the water line, increasing buoyancy and altering the amplitude of the bow wave of the vessel.

SUMMARY OF THE INVENTION

There is provided, according to a first aspect of the invention, a hull for a marine vessel, the hull having a water line, a bow end and an aft end. The hull has a first opening below the water line and a second opening below the water line, the first opening being closer than the second opening to the bow end. A first conduit extends from the first opening to the second opening, whereby water flows into the first conduit through the first opening and passes through the first conduit from the first opening towards the second opening, exiting at the second opening. A second conduit extends from a supply of fluid into the first conduit between the first opening and the second opening, fluid being drawn into the first conduit via the second conduit and exiting at the second opening.

There is provided, according to a second aspect of the invention, a method for reducing friction on a hull for a marine vessel, the hull having a water line, a bow end and an aft end. The method includes passing water through a first opening below the water line to a second opening below the water line, the first opening being closer than the second opening to the bow end, the water passing through a first conduit extending from the first opening to the second opening, and drawing air through a second conduit extending into the first conduit between the first opening and the second opening. The air exits at the second opening to reduce the frictional resistance of the hull.

The invention offers significant advantages compared to the prior art. In particular it overcomes disadvantages found with the frictionally reduced hull disclosed in U.S. Patent Application Publication No. US 2001/0022152. There is no need for hulls made according to the invention to have any projection below the hull in order to induce a negative pressure area. Instead, the second conduit is inserted into a first conduit which can extend within the interior of the hull. Also, there is no need for a very long conduit as encountered with the published U.S. application. Furthermore, the air can be easily dispersed since it is expelled from the conduit through an opening which can be flush with the hull itself.

Decreasing hull friction results in greater vessel speed with the same power. Alternatively smaller engines can be used to yield the same speed as similar vessels without this improvement having larger engines. Also smaller fuel tanks are accordingly required and therefore reduce the weight of the vessel.

The invention is well adapted to be retrofitted to existing hulls as well as for new vessels. Unlike some of the prior art, the invention does not require redesign of hulls to yield the improvements.

DETAILED DESCRIPTIONS OF THE PREFERRED EMBODIMENTS

Figure 2:
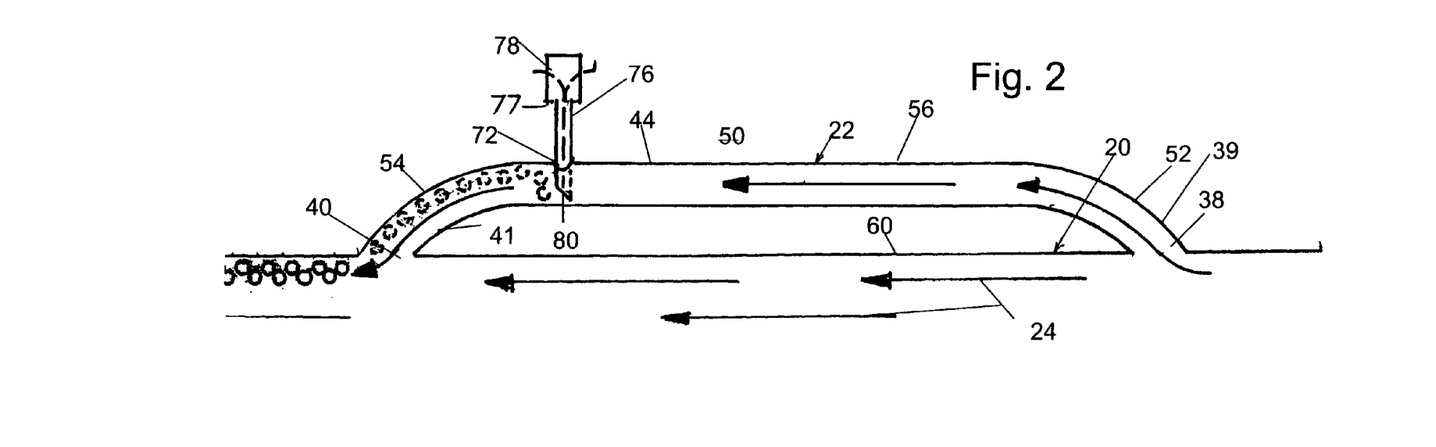
FIG. 2 is a fragmentary, cross-sectional view of an apparatus for reducing friction on the hull of a marine vessel, according to an embodiment of the invention.

Referring to the drawings, and first to FIG. 2, this shows a fragment of a marine hull 20 and an apparatus 22 for reducing friction between the hull and the water. Arrows 24 indicate the direction of movement of ambient water relative to the hull as a vessel moves to the right, from the point of view of FIG. 2.

Figure 6:
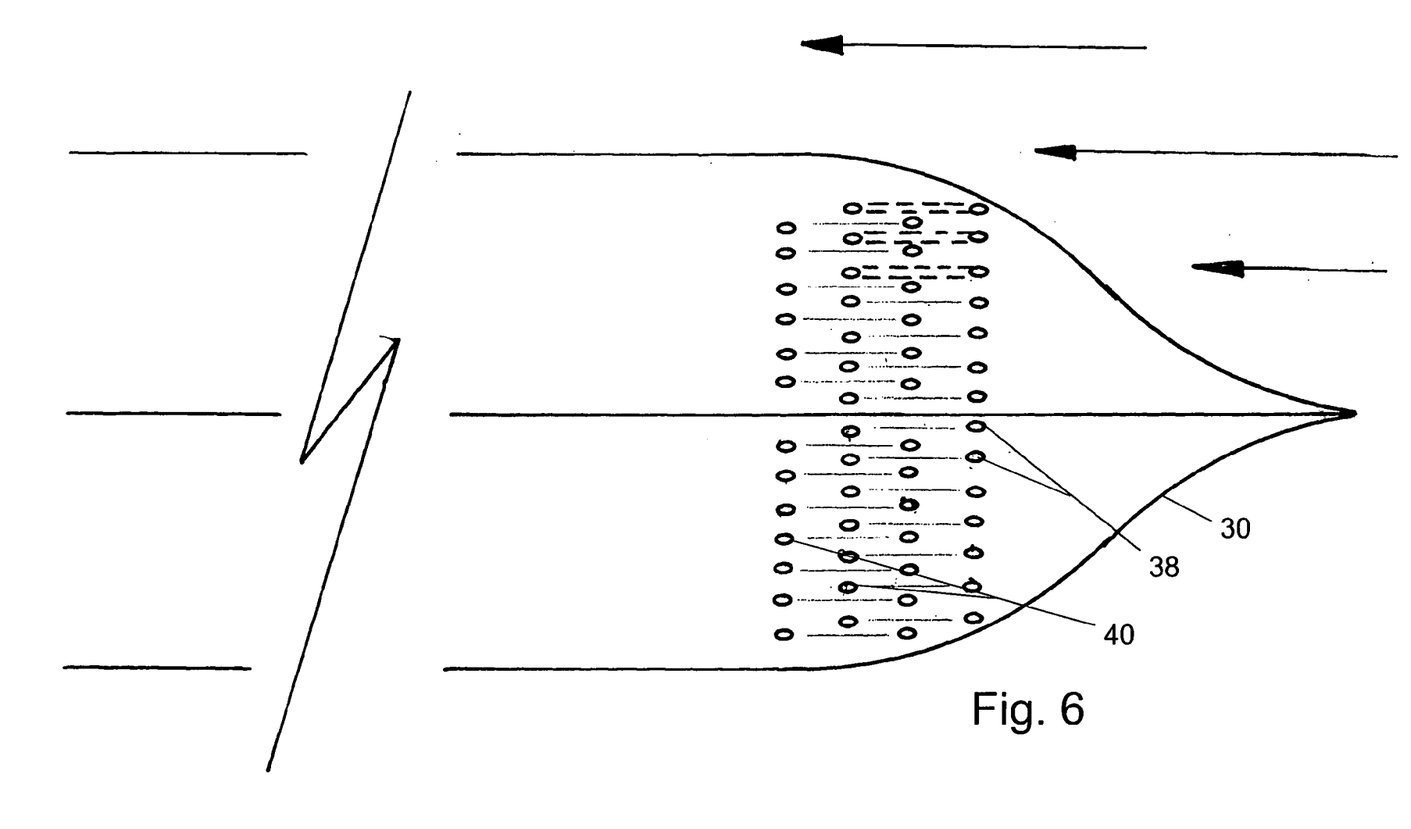
FIG. 6 is a fragmentary bottom view of a frictionally reduced hull showing water inlets and outlets for a plurality of apparatuses as shown in FIG. 2.
Figure 8:
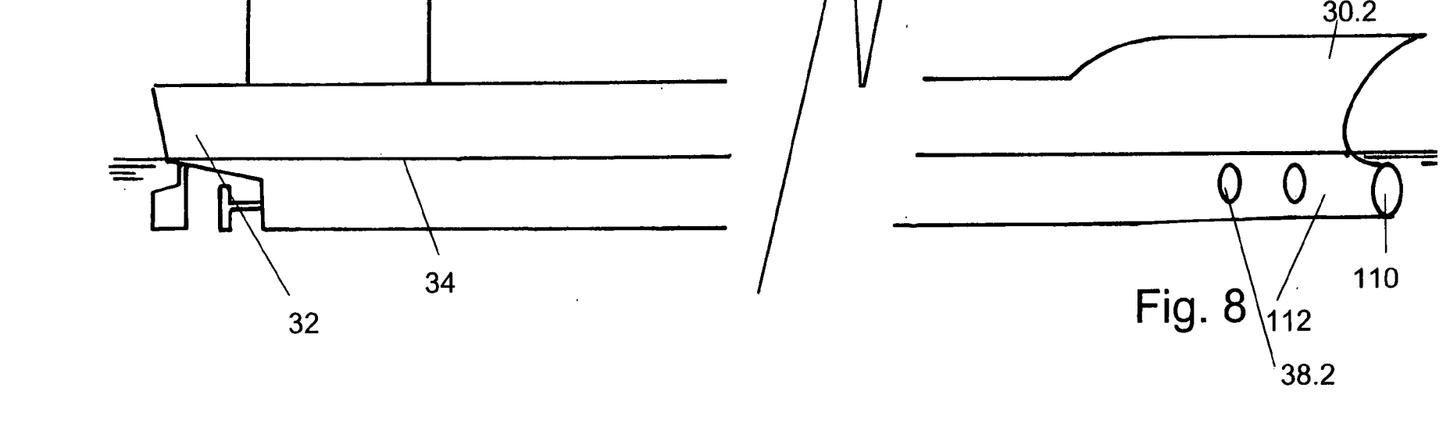
FIG. 8 is a fragmentary, side view thereof.

The hull of the marine vessel has a bow end 30 shown in FIG. 6 and an aft end 32 shown for the embodiment of FIG. 8. The vessel also has a water line 34, also shown for the embodiment of FIG. 8. The hull has a first opening 38 below the water line as shown in FIG. 2. There is also a second opening 40. The first opening is closer than the second opening to the bow end of the vessel. A first conduit 44 extends from the first opening to the second opening. In this example the first conduit is a steel pipe, or tube which is welded to the hull at ends 39 and 41, which are adjacent the openings 38 and 40 respectively, and extends within the inside 50 of the hull. In this particular example the conduit has upwardly curving portions 52 and 54 at the opposite ends and a horizontally extending portion 56 therebetween, which is spaced-apart from bottom 60 of the hull.

There is also a second conduit 76, in this example a tube, which extends sealingly through an opening 72 in the first conduit. The second conduit 76 has a one-way valve 78 connected to end 77 thereof. As seen best in FIG. 3, the second conduit has an open end 80 within the first conduit 44 which is angled towards the second opening 40, as shown in FIG. 2. This deflects water passing through the first conduit 44 from entering the second conduit 76. At the same time, it produces a reduced pressure region 84 downstream from side 86 of the first conduit which faces the stream of water passing through the first conduit. This reduced pressure region draws air through the second conduit into the first conduit as shown by bubbles 90.

Figure 3:
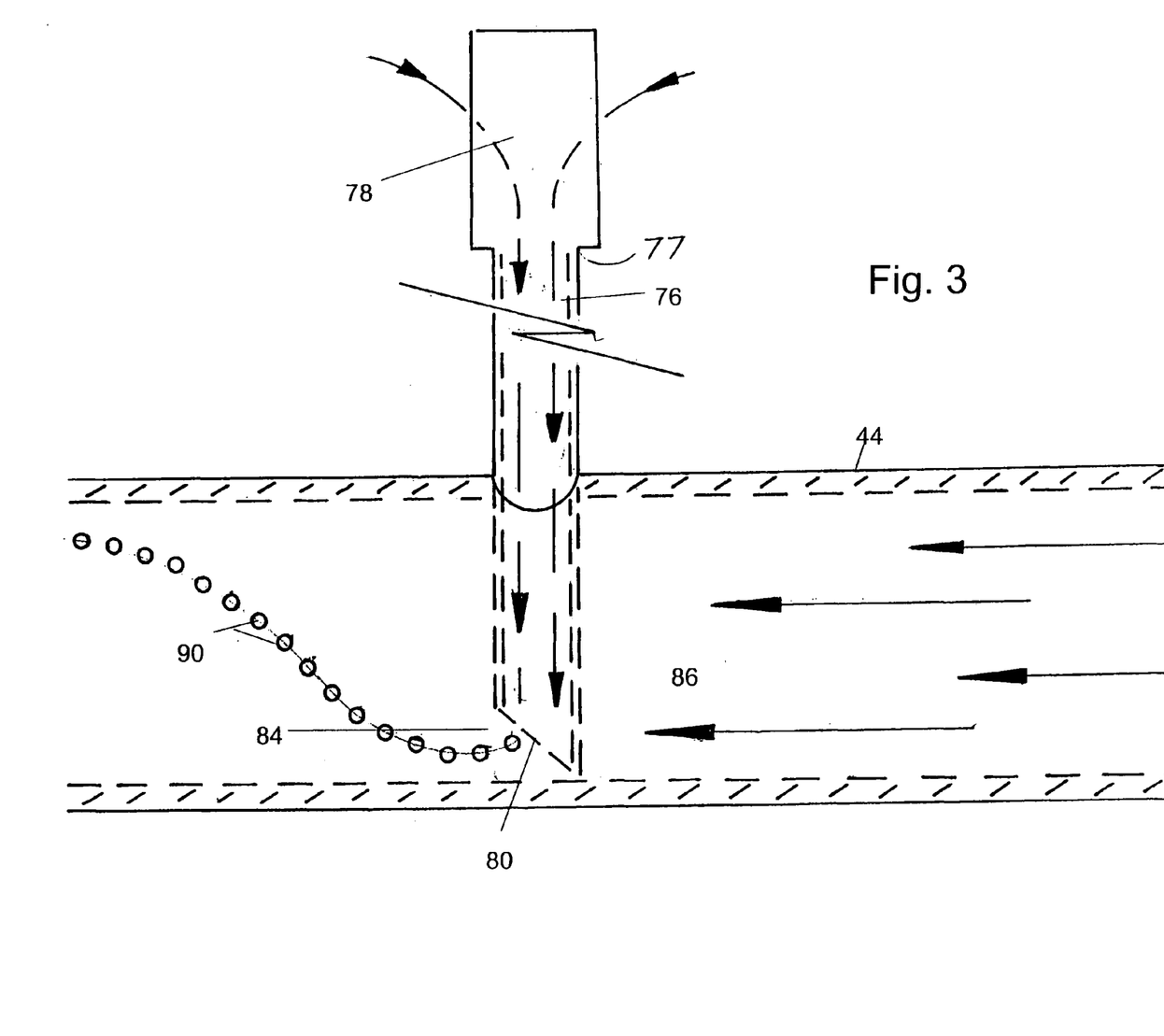
FIG. 3 is an enlarged cross-sectional view thereof showing a portion of the water conduit and the air conduit thereof.

The end 77 of the second conduit is exterior to the first conduit and communicates with a supply of air, simply ambient air in this particular example. One-way valve 78 located on end 77 of the second conduit prevents water from rising through the second conduit and entering the vessel. For example the one-way valve may be a backflow preventer as manufactured by Conbraco Industries Inc. of Matthews, N.C. Models 40-100 and 40 100-02 are used in some embodiments although other models could be substituted or other types of one-way valves.

Figure 4:
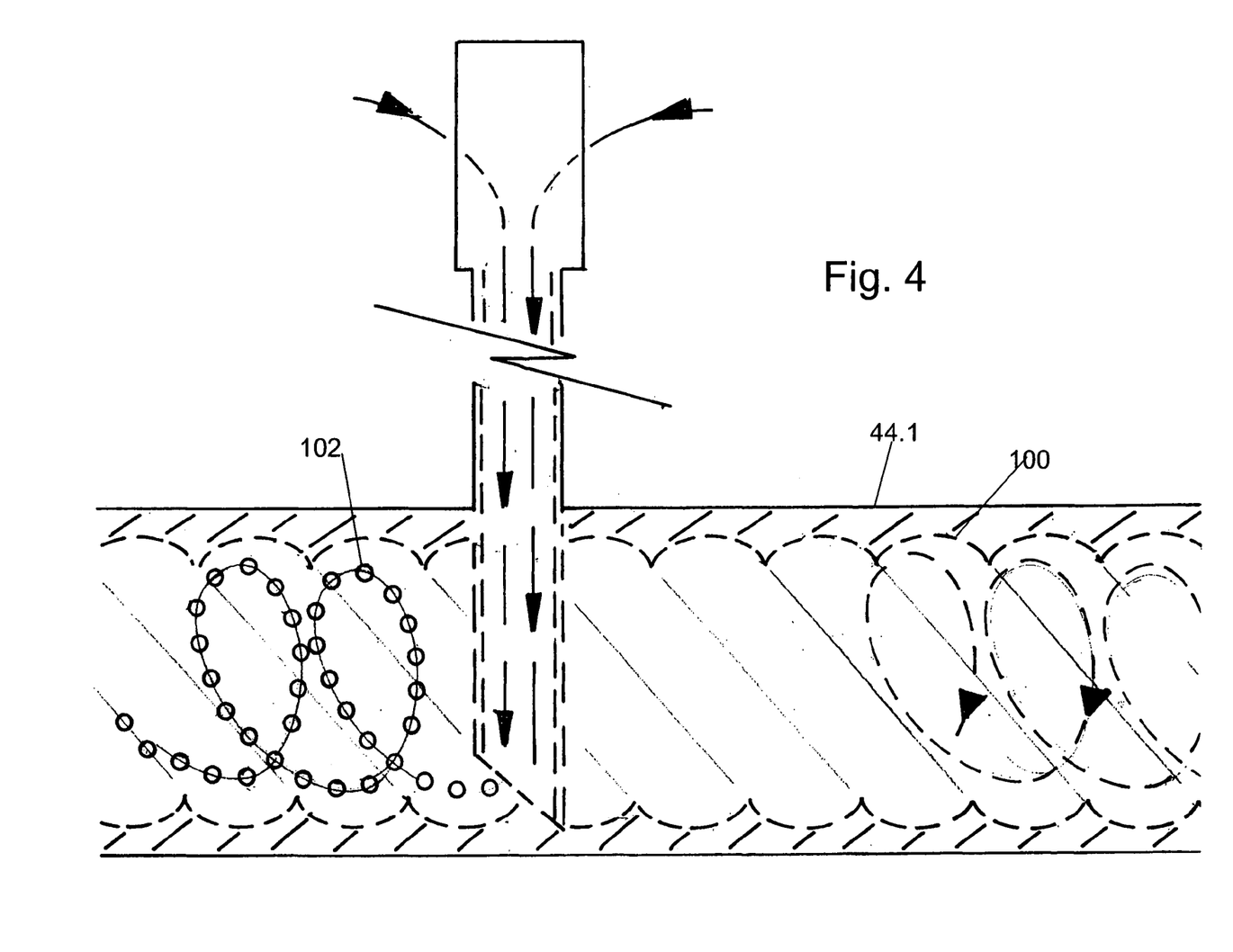
FIG. 4 is a view similar to FIG. 3, but having a water conduit with a spiral-shaped interior.

A variation of the invention is shown in FIG. 4. This is similar to the version shown in FIG. 3, but in this example, where like parts have like numbers with the addition of ".1", the first conduit 44.1 has an interior 100 with a spiral profile. This causes swirling of water passing through the conduit for better mixing of the air and water as shown by bubbles 102.

Figure 1:
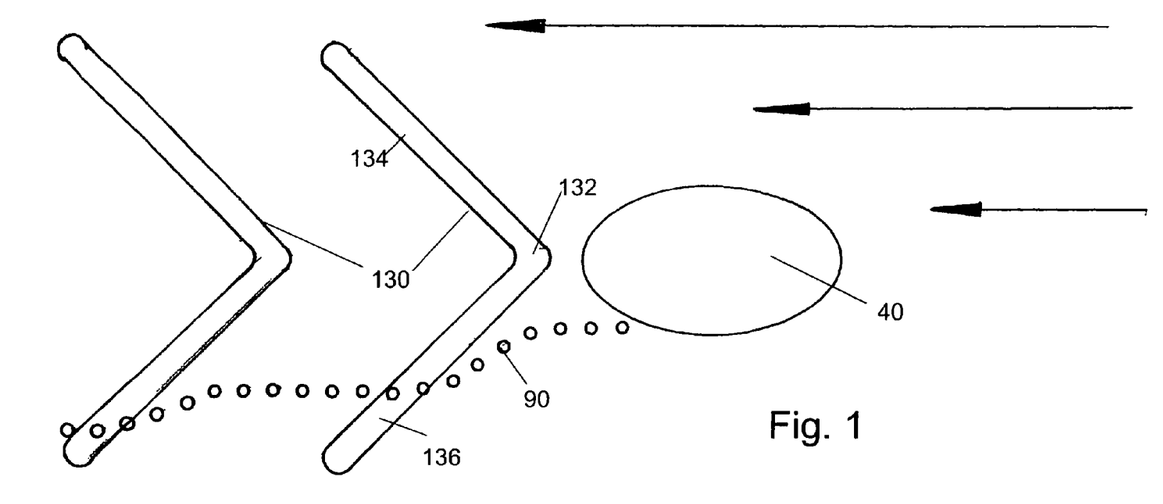
FIG. 1 is an enlarged, fragmentary bottom plan view of a hull of a marine vessel showing an air outlet opening with a pair of air deflectors located rearwardly thereof.

As shown in FIG. 6, preferably there is a plurality of sets of first openings 38 and second openings 40 extending across the hull. Each has an associated first conduit 44 and second conduit 76 as shown in FIG. 1. In the example shown in FIG. 6, there is a total of 27 pairs of first and second openings in two staggered rows. Clearly the number of sets would vary according to such factors as the size of the hull. Generally however these are located near the bow end 30 of the hull.

It should be understood that not all of the first openings 38 are necessarily below the water line at the same time. For example, on sailing vessels the openings on one side of the vessel may be below water, while the openings on the other side of the vessel may be above water depending upon the attitude of the vessel.

Figure 7:
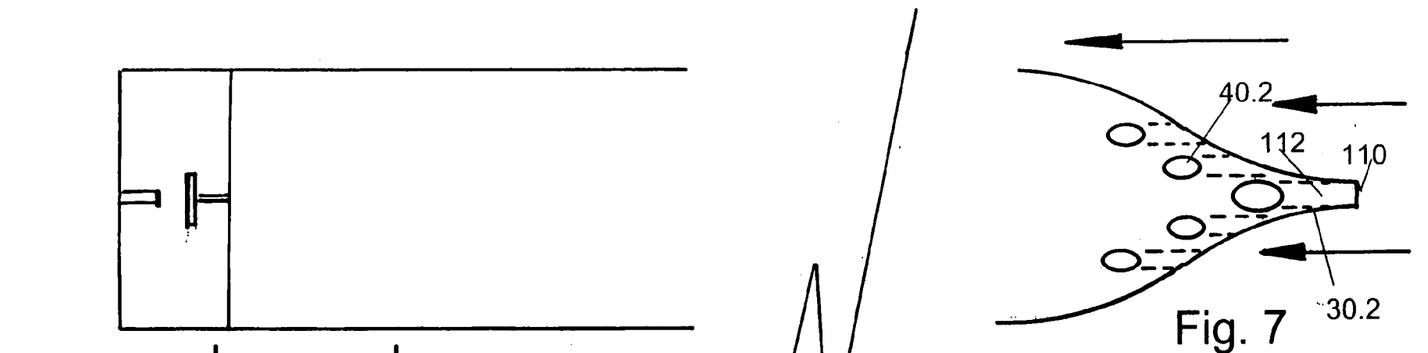
FIG. 7 is a view similar to FIG. 6, showing a vessel with a projecting bow.
Figure 9:
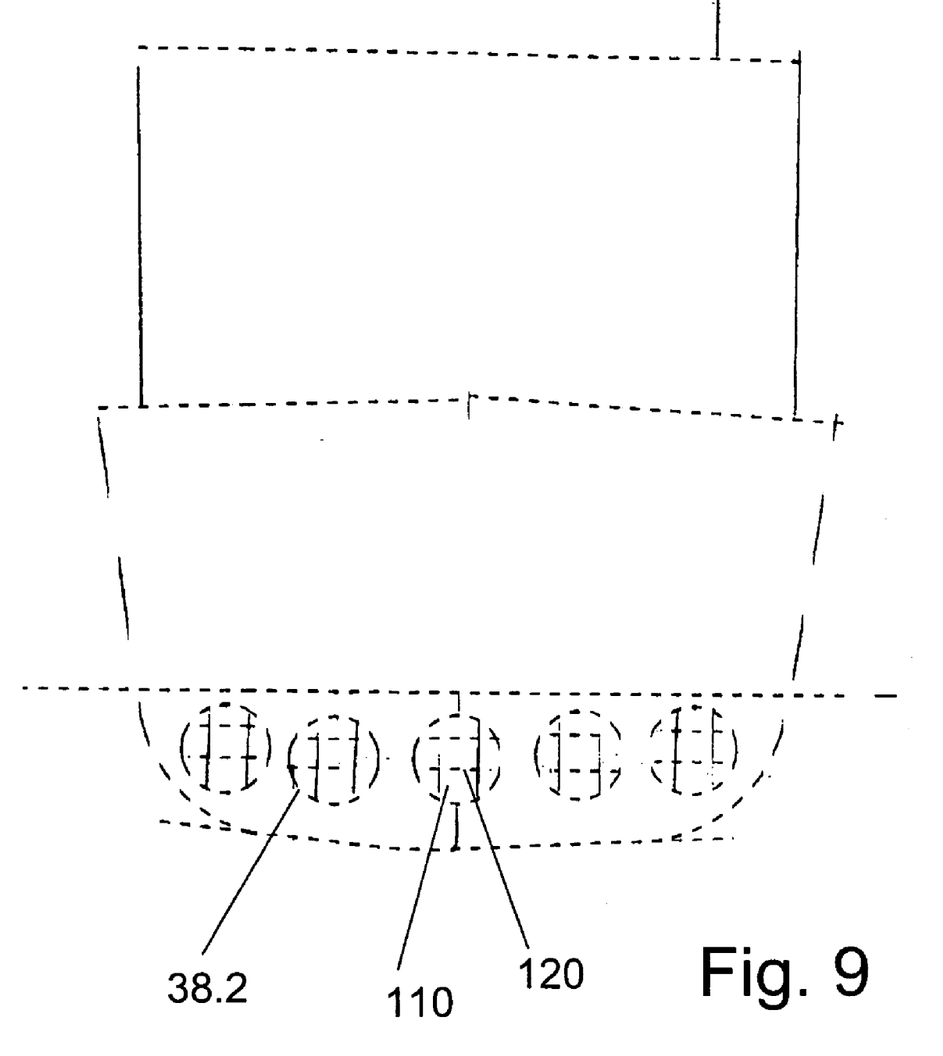
FIG. 9 is a front view thereof, showing a variation with grills on the water inlets.

Another embodiment of the invention is shown in FIGS. 7–9 where the hull has a projection 112 which replaces the bulbous projection found on many marine vessels. In this embodiment corresponding parts have corresponding numbers as in the first embodiment with the additional designation ".2". The first openings 38.2 are directed forwardly at the bow end 30.2 of the vessel. One of these openings 110 is at the forward end of projection 112. With reference to FIG. 9, each of these openings is equipped with a screen or grill 120 which prevents debris from entering the first conduits. The openings 38.2 are located typically below the loaded water line of the vessel on the flared portion of the hull. In place of a bulbous bow there is the protruding round opening 110 for water. These openings lead to first conduits of similar diameter to the inlet opening. The first conduits extend longitudinally and, at the ends opposite the inlets, curve down and meet an outlet 40.2 located on the underside of the hull form. Second conduits extend into these first conduits similar to the previous embodiments.

The effect of the large inlets and outlets is twofold. The first is to generate bubbles which cover a significant portion of the submerged hull form, thereby reducing viscous drag. The other is to significantly reduce the propensity of the hull form to make waves at the bow area, thereby diminishing wave making resistance. Instead of the vessel initially trying to displace water immediately before it, equally to both sides of the bow, the water is rather drawn through opening 110 into the first conduit and discharged under the hull. This creates less resistance against the hull of the vessel. Also, with the water passing through the first conduits in the bow area, the vessel is effectively receiving ballast, thereby damping down the pitching motion of the vessel.

FIG. 1 shows a system for dispersing bubbles 90 exiting each of the second openings 40. This system includes one or more V-shaped deflectors 130. Each is positioned adjacent to one of the second openings in between each of the second openings and the aft end of the hull. Each deflector has an apex 132 facing one of the second openings and diverging legs 134 and 136 extending away from the apex towards the aft end of the hull. In this example each of the deflectors is raised relative to the hull, but is relatively shallow so as not to exceed the thickness of the layer of air exiting from the second openings in the form of bubbles 90. In this way, the deflectors do not significantly increase the friction of the hull. Optionally the deflectors can be recessed on the hull.

Figure 5:
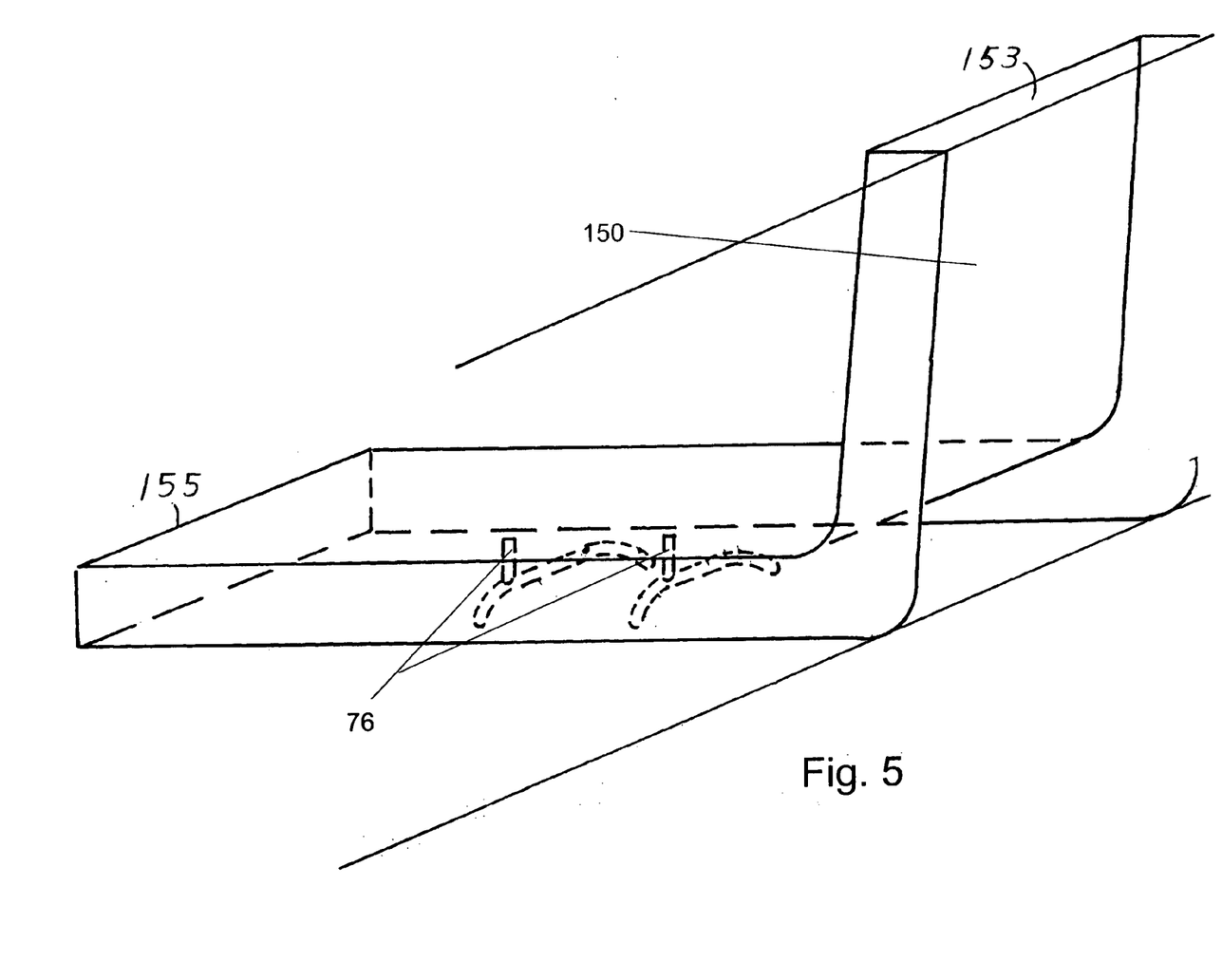
FIG. 5 is an isometric view of an air plenum for supplying air to a plurality of apparatuses as shown in FIG. 2.

As shown in FIG. 5, a single plenum 150, which may be open at either end 153 or 155 or both ends, can communicate with a plurality of second conduits 76 so the plenum acts as an air supply for the entire system. The conduits 76 are located within the plenum in this example.

Figure 10:
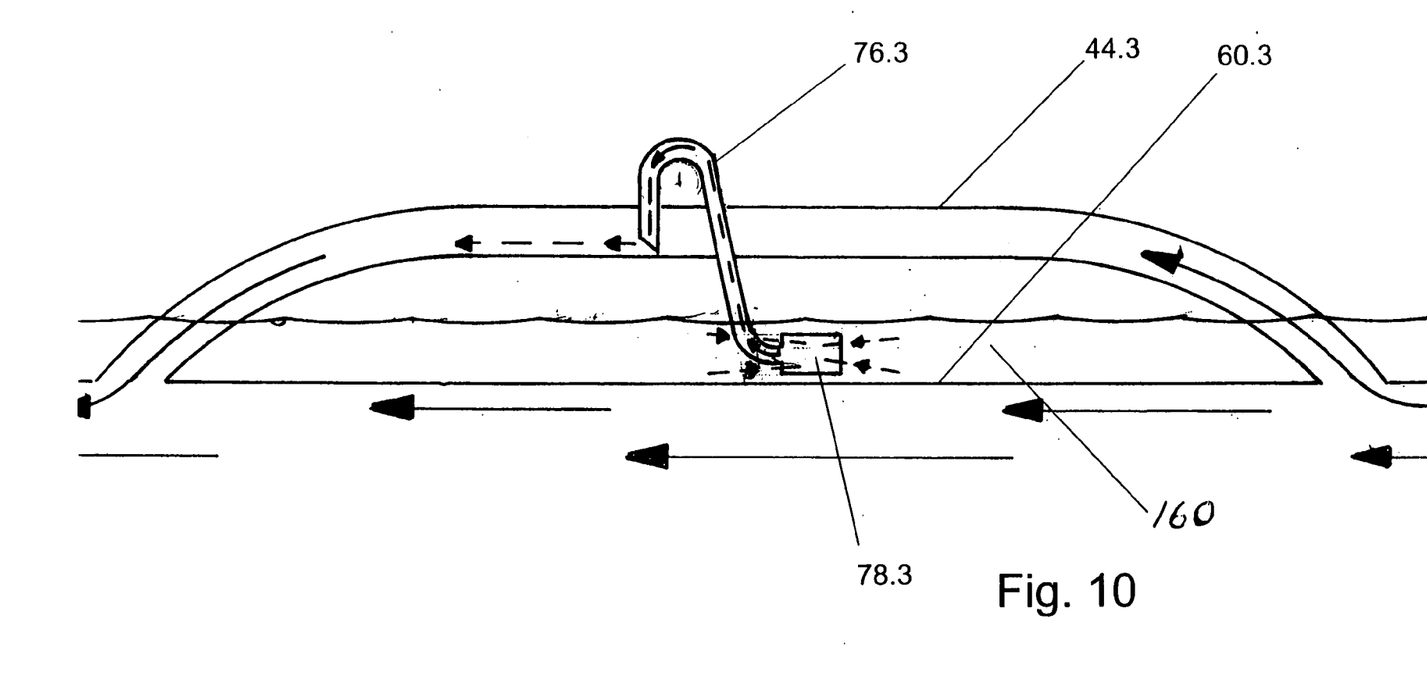
FIG. 10 is a view similar to FIG. 2, showing an alternative embodiment with a flexible second conduit acting as a bilge pump.

FIG. 10 shows a variation of the invention of FIG. 2. Like parts have like numbers with the addition ".3". In this case the first conduit 76.3 is flexible and can extend so one-way valve 78.3 is adjacent to bottom 60.3 of the inside of the hull. In this way, the apparatus can act as a bilge pump for pumping water 160 from the inside of the hull and discharging it into the first conduit 44.3. After the water is emptied, air is discharged.

The embodiment of FIG. 10 is particularly useful for sailboats, ships and towed vessels such as barges and provides a means to remove water from the bilges without requiring a powered bilge pump.

It will be understood by someone skilled in the art that many of the details provided above are given by way of example only and can be varied or deleted without departing from the scope of the invention as set out in the following claims.

What is claimed is:

1. A hull for a marine vessel, the hull having a water line, a bow end and an aft end, the hull having a first opening below the water line and a second opening below the water line, the first opening being closer than the second opening to the bow end, a first conduit extending from the first opening to the second opening, whereby water flows into the first conduit through the first opening and passes through the first conduit from the first opening towards the second opening, exiting at the second opening, a second conduit extending from a supply of fluid into the first conduit between the first opening and the second opening, fluid being drawn into the first conduit via the second conduit and exiting at the second opening, V-shaped deflectors being positioned adjacent to the second opening and between the second opening and the aft end of the hull to disperse air exiting through the second opening.

2. The hull as claimed in claim 1, wherein each of said deflectors has an apex facing the second opening and diverging legs extending away from the apex towards the aft end of the hull.

3. The hull as claimed in claim 2, wherein the deflectors are raised.

4. The hull as claimed in claim 3, wherein the deflectors are raised relative to the hull an amount not exceeding a thickness of a layer of air exiting from the second opening.

5. The hull as claimed in claim 1, wherein the deflectors are recessed on the hull.

6. A hull for a marine vessel, the hull having a water line, a bow end and an aft end, the hull having a first opening below the water line and a second opening below the water line, the first opening being closer than the second opening to the bow end, a first conduit extending from the first opening to the second opening, whereby water flows into the first conduit through the first opening and passes through the first conduit from the first opening towards the second opening, exiting at the second opening, a second conduit extending from a supply of fluid into the first conduit between the first opening and the second opening, fluid being drawn into the first conduit via the second conduit and exiting at the second opening, the hull having an inside, the first conduit being within the inside of the hull, the inside of the hull having a bottom, the second conduit extending to near the bottom of the inside of the hull to act as a bilge pump to remove water therefrom.

7. The hull as claimed in claim 6, wherein the second conduit is flexible.

8. A hull for a marine vessel, the hull having a water line, a bow end and an aft end, the hull having a first opening below the water line and a second opening below the water line, the first opening being closer than the second opening to the bow end, a first conduit extending from the first opening to the second opening, whereby water flows into the first conduit through the first opening and passes through the first conduit from the first opening towards the second opening, exiting at the second opening, a second conduit extending front a supply of fluid into the first conduit between the first opening and the second opening, fluid being drawn into the first conduit via the second conduit and exiting at the second opening, the fluid being a gas, the second conduit having an open end within the first conduit which is angled towards the second opening, thereby deflecting water passing through the first conduit from entering the second conduit.

* * * * *